US006353358B1

United States Patent
Yoshie

(12) United States Patent
(10) Patent No.: US 6,353,358 B1
(45) Date of Patent: Mar. 5, 2002

(54) QUADRATURE DEMODULATION CIRCUIT WITH A PSEUDO LOCKED STATE DETECTION SYSTEM

(75) Inventor: Kazuaki Yoshie, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/533,583

(22) Filed: Mar. 23, 2000

(30) Foreign Application Priority Data

Mar. 25, 1999 (JP) .......................................... 11-081788

(51) Int. Cl.[7] .................................................. H04J 3/06
(52) U.S. Cl. ........................ 329/304; 375/344; 375/376; 370/206; 455/260
(58) Field of Search .......................... 329/304; 375/344, 375/362, 376; 455/206, 260; 370/503, 510, 516, 512; 348/513

(56) References Cited

U.S. PATENT DOCUMENTS 4,646,151 A * 2/1987 Welles, II et al. .......... 348/513

5,463,627 A * 10/1995 Matsuoka et al. .......... 370/350

* cited by examiner

*Primary Examiner*—Arnold Kinkead
(74) *Attorney, Agent, or Firm*—Hogan & Hartson

(57) ABSTRACT

When it is detected that a carrier reproduction in a demodulator (6) loop is locked and that frame synchronization cannot be established in data from the demodulator (6), a detection signal c representing occurrence of a pseudo locked state is output. In accordance with the detection signal c, the timer (22) is activated to count up. When the timer (22) counts a predetermined value, an address counter (23) is made to count up, and correction data in accordance with an address signal is read from a correction data memory (24). The correction data is added up with channel selection data and is input to a programmable divider (15) where a local oscillation frequency is subjected to fine adjustment. The address signal remains updated until the pseudo locked state is released.

19 Claims, 6 Drawing Sheets

| ADDRESS | MEMORY |
|---------|--------|
| 0 | 0 |
| 1 | $+fsym/2^n$ |
| 2 | $-fsym/2^n$ |
| 3 | $+2 \cdot fsym/2^n$ |
| 4 | $-2 \cdot fsym/2^n$ |
| ⋮ | ⋮ |

Fig. 2

QUADRATURE DEMODULATION CIRCUIT WITH A PSEUDO LOCKED STATE DETECTION SYSTEM

BACKGROUND OF THE INVENTION

1. Field of the Invention

The present invention relates to a pseudo locked state detection system for detecting and preventing a pseudo locked state from occurring in a quadrature demodulation circuit used for digital television broadcasting.

2. Description of Related Art

The technology for supplying digital television broadcasting signals having been practically implemented, commercial digital television broadcasting has begun. Commercial digital television broadcasting can be broadly divided into either broadcasting where digital television signals are transmitted by satellite or broadcasting using terrestrial waves. In the following, satellite digital television broadcasting will be described.

FIG. 5 illustrates a structure of one frame of digital data to be received in a satellite digital broadcasting receiver. One frame of digital data as depicted in FIG. 5 contains 39936 symbols, a symbol as used herein referring to a signal received in synchronization with one clock. The leading end portion of one frame includes a transmission multiple control (TMCC) signal for transmitting control information regarding a slot signal or a transmission system, and a synchronization word signal. The synchronization word signal contains a total of 40 symbols, while the number of symbols in the TMCC and synchronizing word signals totals 192, which are to be transmitted as a BPSK (binary PSK) modulation signal.

After the TMCC signal and the synchronization word signal, data (containing separate tracks such as video, audio, or the like) and carrier clock burst signals are alternately provided. Each data portion contains 203 symbols and each carrier clock burst signal contains 4 symbols. A carrier clock burst signal is a BPSK modulation signal.

A data portion containing 203 symbols and a carrier clock burst signal portion containing 4 symbols constitute one set of data, and 4 sets in succession, ((203+4)×4) symbols, is referred to as one "slot".

Slots are modulated using different types of modulation. The type of modulation used and the order of data transmission are recognized after drawing frequency of the carrier clock has been determined, by detecting a synchronization word, establishing a frame synchronization, and demodulating the TMCC. The modulation types to be used include 8PSK, QPSK (Quadrature PSK), BPSK, or the like.

FIG. 6 illustrates a structure of a satellite digital broadcasting receiver. A digital television signal transmitted from a satellite is received by a tuner 61 where synchronous detection is applied while the frequency is down-converted. A digital modulation signal obtained from the tuner 61 is demodulated in a quadrature demodulation circuit 62 to produce I and Q baseband signals. A PSK demodulation circuit 63 provides various types of PSK demodulation according to the I and Q baseband signals, and an error correction circuit 64 applies error correction to a PSK demodulation signal. The PSK demodulation signal subjected to error correction is decoded into motion image data or audio data in a signal processing circuit 65 according to set protocols such as those of the MPEG1 or MPEG2 system.

In a digital broadcasting receiver having a configuration as shown in FIG. 3, I and Q baseband signals are demodulated from a digital television signal. As shown in FIG. 3, adders 1 and 2 apply quasi synchronous detection to a digital television signal and respectively output an I signal and a Q signal. The I signal, only a low frequency component of which passes through an LPF 3, is converted into a digital value in an AD converter 4 and is input to a demodulator 6 via a matched filter 5. Similarly, the Q signal, again only a low frequency component of which passes through an LPF 7, is converted into a digital value in an AD converter 8 and is input to the demodulator 6 via a matched filter 9.

The demodulator 6 outputs I and Q baseband signals demodulated with a reproduced carrier. Carrier reproduction is performed by detecting a frequency shift of the I and Q baseband signals. Namely, the I and Q baseband signals are input to a phase error detection circuit 10 to be compared with I and Q baseband signals from one clock before to obtain a phase angle difference. A phase error of the received signal is detected by using this difference, and is applied to an NCO circuit 11 which then outputs a frequency signal fp in accordance with the phase error, and the frequency signal fp is further fed back to the demodulator 6. In accordance with the frequency signal fp, complex multiplication is applied to the input I and Q signals. The demodulator 6 corrects the vectors of the I and Q signals and outputs the corrected signals as the I and Q baseband signals, to which signal processing such as error correction is carried out by an error detection/correction circuit 12 provided downstream of the demodulator 6.

With the configuration FIG. 3, when a frequency difference between a local oscillation signal fr and a modulation carrier signal fc to be applied to the multipliers 1 and 2 is Δf, the following equation (1) is obtained.

$$\Delta f = |fr - fc| \qquad (1)$$

When Δf=0, correct baseband signals can consistently be obtained without any correction in the demodulator 6. Specifically, in the case of QPSK modulation, the baseband signals can consistently be obtained at points indicated by ● in a signal space view shown in FIG. 4. When Δf≠0, on the other hand, the phase of a baseband signal shifts while the phase amount is continuously changing. Namely, the phase of the vector of a baseband signal rotates around the circle in FIG. 4. Therefore, the carrier reproduction loop controls the output frequency fp of the NCO circuit such that |Δf−fp|=0, to thereby realize the baseband signals at the points ● as shown in FIG. 4 by preventing the phase of the baseband signals of the demodulator 6 from rotating.

However, pseudo-lock occurs in the carrier reproduction loop of the demodulator 6 when the following frequency relationship is established, where a reproduction clock is represented by fsym.

$$|\Delta f - fp| = m \times fsym/2^n \qquad (2)$$

where m and n are integer values, and an integer n changes depending on the demodulation type. For instance, n=1 in the BPSK modulation, n=2, in the QPSK modulation, and n=3 in the 8PSK modulation. When the phase of a baseband signal at point A shifts 360° and returns back to the point A during the reproduction clock period as shown in FIG. 4, for example, no phase shift is apparent. Because the actual phase shift is not detected, a pseudo carrier locked state in which the carrier reproduction loop acts as if locked occurs. In this state, although a baseband signal can be demodulated, the baseband signal does not contain correct data.

Since the phase of the baseband signal vector is detected after shifting the vector to the first quadrant in FIG. 4, the phase shift amount of a baseband signal which will cause a pseudo carrier locked state differs depending on the modulation type. In the case of the QPSK modulation in which the baseband signals exist at the four points in FIG. 4 indicated by ●, pseudo carrier lock occurs even with a phase shift of m×fsym/4.

A conventional method of detecting a pseudo carrier lock will also be described with reference to FIG. 3. Referring to FIG. 3, there are provided the error detection/correction circuit 12 for detecting and correcting an error of a baseband signal from the demodulator 6, and a CPU 13 for detecting a pseudo carrier lock state according to detection signals from the phase error detection circuit 10 and the error detection/correction circuit 12. When a pseudo carrier locked state occurs, the baseband signal does not contain correct data and the error detection/correction circuit 12 produces an error detection signal. The CPU 13, receiving this error detection signal and a lock detection signal generated by the phase error detection circuit 10 when the carrier reproduction loop is locked, determines the pseudo carrier locked state.

Upon detecting the pseudo carrier locked state, the CPU 13 changes the number of dividing of a programmable divider 15 in a PLL circuit for channel (broadcast station) selection until the pseudo carrier locked state is released. The local oscillation frequency fc is changed by thus changing the divisor to thereby break the frequency relationship defined in the above equation (1). The carrier reproduction loop temporarily enters an unlocked state for drawing a correct carrier lock because the PLL circuit will be locked at a different frequency.

In the example described above, however, since the pseudo carrier locked state is detected by software operating in the CPU 13, the CPU 13 must continuously monitor both the lock detection signal and the error detection signal. Namely, a conventional structure requires continuous monitoring of the pseudo carrier locked state by the software of the CPU 13, imposing a significant burden on the software. Further, because the interface of the CPU 13 is for serial data, a significant amount time is required for data reception, and it is difficult to quickly detect the pseudo locked state because such detection is executed by the software.

SUMMARY OF THE INVENTION

The present invention aims to provide a circuit which simply and rapidly detect a pseudo locked state of a reproduction clock.

According to the present invention, in a locked state of a reproduction clock, the state of establishment of frame synchronization is determined. In a pseudo locked state, data is not correctly demodulated and therefore frame synchronization cannot be established. Thus, a pseudo locked state can be easily determined by the detection of frame synchronization.

Frame synchronization is always detected whenever data is received. Therefore, this circuit is also utilized for detecting whether or not frame synchronization is established to thereby eliminate the need for any extra circuits.

Data in accordance with a phase difference causing a pseudo locked state, which is known in advance, is stored in a correction memory and is read out as correction data when a pseudo locked state is detected, thereby enabling correction processing to be rapidly performed. In particular, such a structure can be easily implemented by hardware.

BRIEF DESCRIPTION OF THE DRAWINGS

These and other objects of the invention will be explained in the description below, in connection with the accompanying drawings, in which:

FIG. 2 is a chart indicating a relation between addresses and correction data within a correction data memory;

DETAILED DESCRIPTION OF THE PREFERRED EMBODIMENT

A preferred embodiment of the present invention will be described in further detail with reference to the accompanying drawings.

Figure 1:
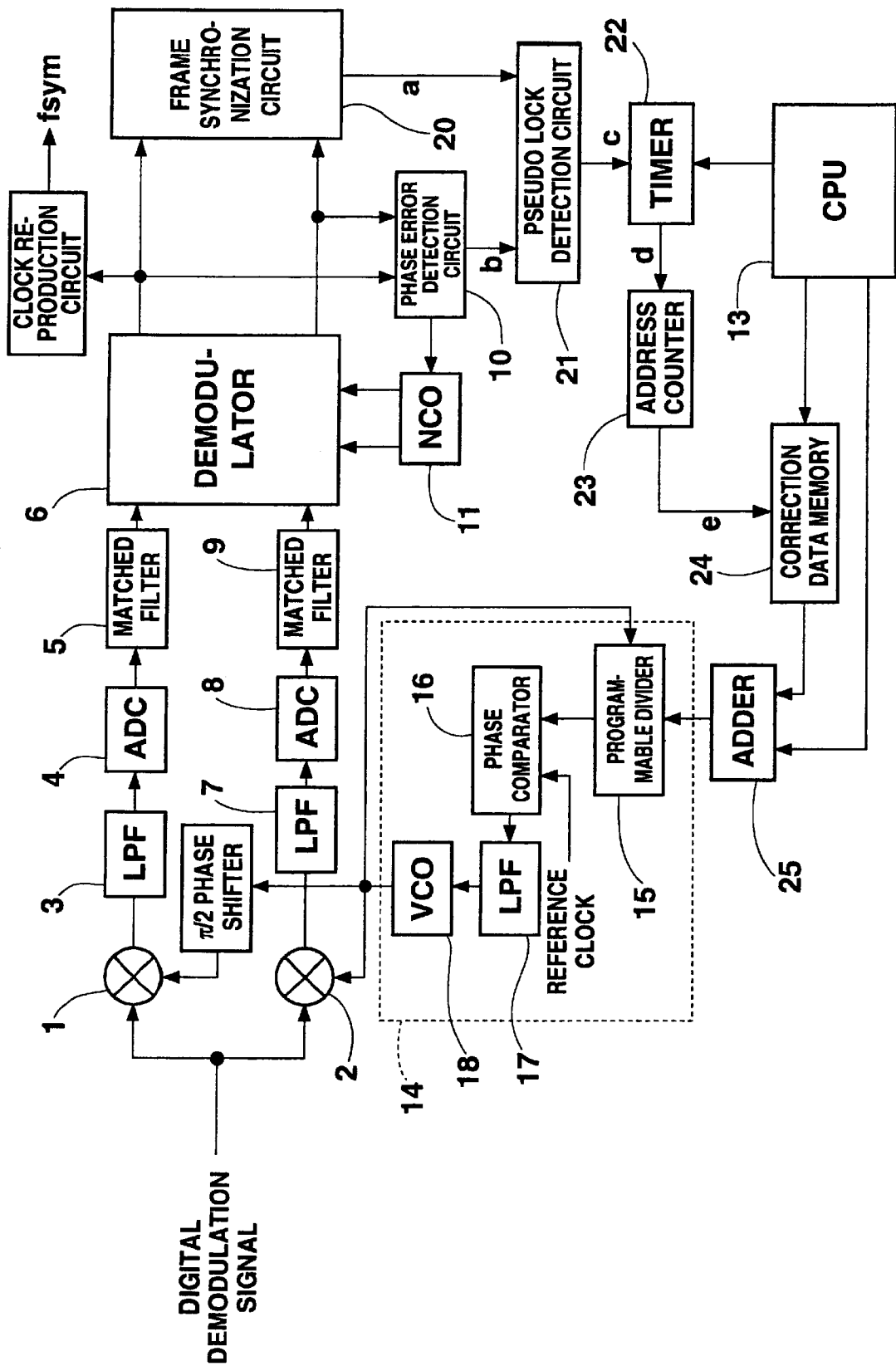
FIG. 1 is a block diagram illustrating a structure of a quadrature demodulation circuit according to an embodiment of the invention.
Figure 3:
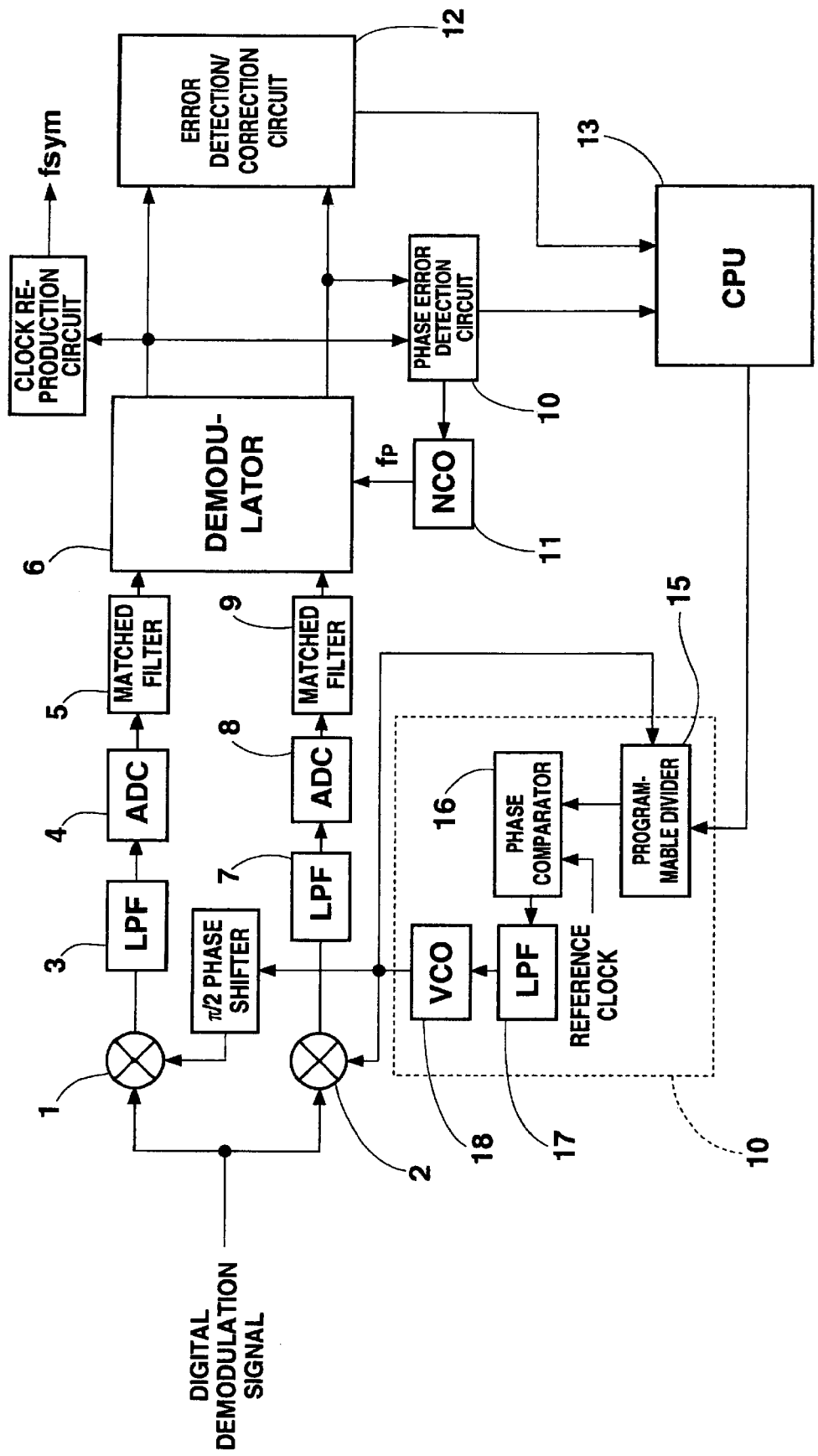
FIG. 3 is a block diagram illustrating a structure of a quadrature demodulation circuit according to a related art.

FIG. 1 illustrates a circuit diagram according to an embodiment of the present invention, in which elements identical to those in the related art of FIG. 3 are designated by the same numerals and will not be described again.

A frame synchronization detection circuit 20 for detecting frame synchronization of a baseband signal from a demodulator 6 is provided before an error detection/correction circuit. In digital television broadcasting, baseband signals are transmitted in frame (packet) units. Baseband signal data are received after a frame synchronization pattern, which represents a leading end of a frame, is detected a plurality of times (frame synchronization protection processing). In other words, data reception commences when it has been determined that the frame synchronization pattern for a plurality of successive frames is correct. Upon detecting a frame synchronization pattern, the frame synchronization circuit 20 outputs a frame detection signal a. When a pseudo locked state occurs, the frame synchronization pattern cannot be detected because a baseband signal cannot be correctly demodulated in the demodulator 6, and therefore a frame detection signal a at this time is in an inactive state.

A pseudo lock detection circuit 21 detects an active state of a lock detection signal b and an inactive state of a frame detection signal a to output a pseudo lock detection signal c representing a pseudo carrier locked state. During a pseudo carrier locked state, the carrier reproduction loop is locked and the baseband signal cannot be demodulated, as described above. When this situation is detected, a pseudo carrier locked state is assumed to be in existence.

A timer 22 executes counting according to an enable state of a pseudo lock detection signal, such that it outputs an output signal d and rests when reaching a preset value downloaded from the CPU 13.

An address counter 23 is made to count up according to the output from the timer 22 to produce an address signal e. A correction data memory 24 includes a plurality of addresses for respectively storing correction data, which is read out in order from data corresponding to a smaller numbered address according to the address signal e. The correction data memory 24 stores, in each address thereof, the correction data shown in FIG. 2, for example the timer, counter and data memory form a pseudo lock prevention circuit. In the example of FIG. 2, at an address with a smaller number stored data corresponding to a smaller phase shift. It is possible to release the pseudo carrier locked state in a short time by readout of the correction data corresponding to a smaller phase shift with a higher possibility of the pseudo carrier lock sequentially at the addresses of a smaller number. For example, the order of correction data may be determined from the normal distribution of phase shifts by which a pseudo carrier locked state occurs.

The correction data memory 24 shown in FIG. 1 is capable of storing data from the CPU 13. When a reproduction clock fsym is variable, the correction data is calculated or read from a table by the CPU 13, and stored in the correction data memory 24. In this case, the correction data memory 24 may preferably be a readable and writable memory such as an RAM. When plural types of reproduction clock fsym are predetermined, the correction data memory 24 may be constituted by a ROM for storing predetermined correction data.

Figure 4:
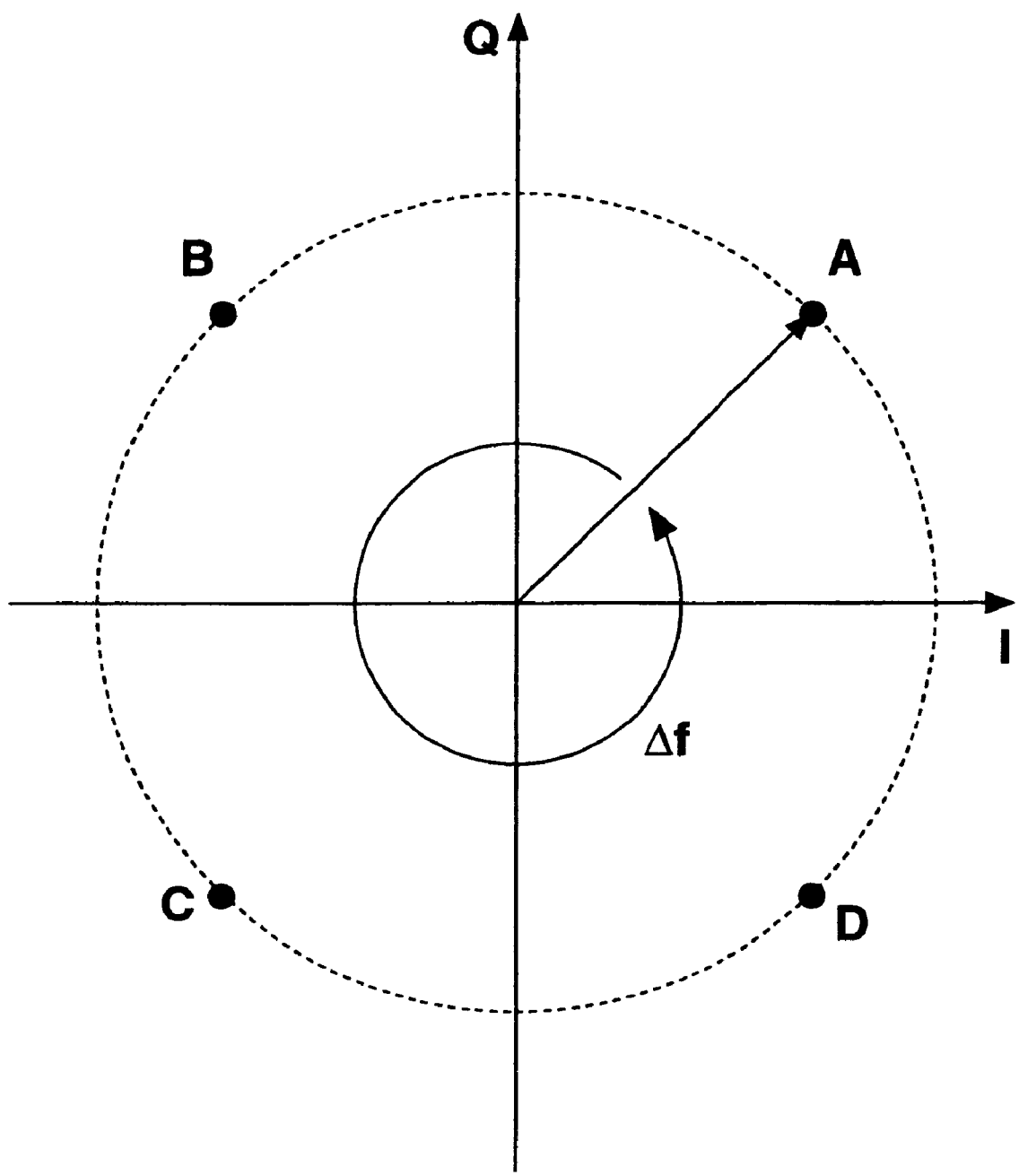
FIG. 4 is a diagram illustrating a signal space in the QPSK system at the time of a pseudo locked state.
Figure 5:
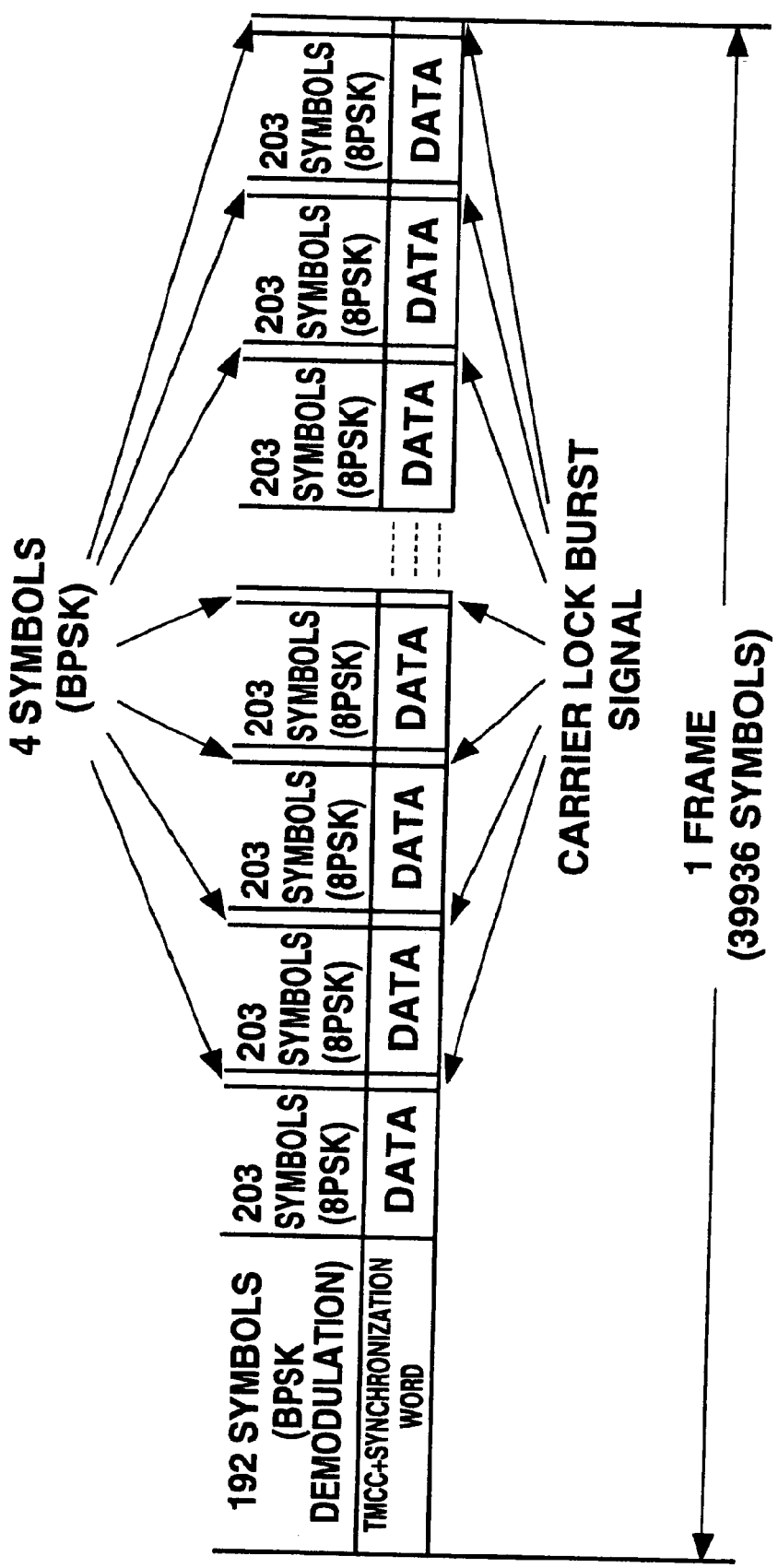
FIG. 5 is a diagram illustrating a data structure of a digital television signal.
Figure 6:
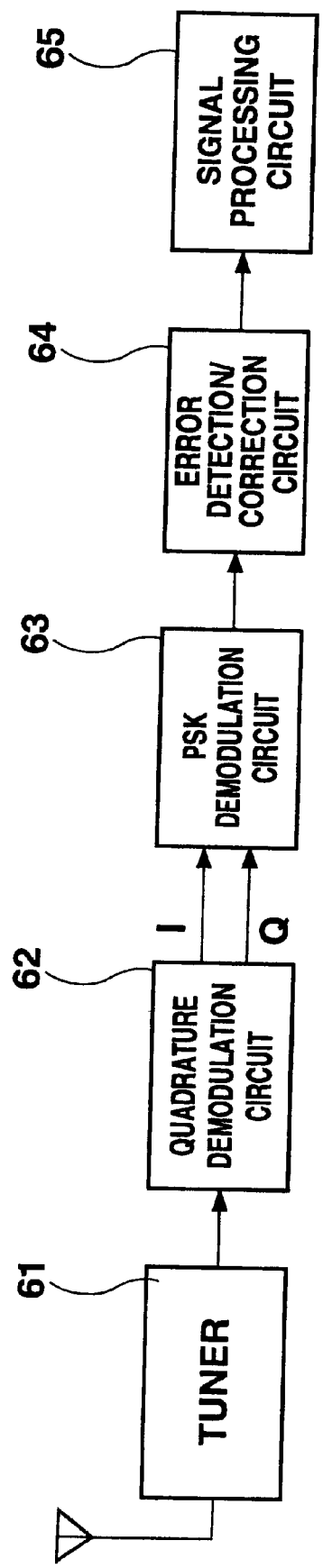
FIG. 6 is a diagram illustrating a structure of a satellite digital television receiver.

An adder 25 adds channel selection data from the CPU 13 with the correction data to produce an output data, which changes the number of dividing of a programmable divider 15 and a local oscillation frequency fr. Accordingly, in the QPSK modulation, the local oscillation frequency fr is subjected to fine adjustment by an amount corresponding to m×fsym/4 of a reproduction clock. The fine adjustment of the frequency of a local oscillation signal fr changes the amount of $\Delta f$ in the above-described equation (1) to thereby force the phase of a baseband signal to change. When an amount of the phase shift of a baseband signal and a correction amount coincide and also directions of the phase shift and of the correction are opposite, the vector of the baseband signal from the demodulator 6 is corrected to a point it should be (a point A indicated by ● in FIG. 4, for example) to thereby release the pseudo carrier locked state.

A series of operations of the circuit of FIG. 1 will be described. In an initial state, the count value of the address counter 23 is set to "0" to designate for the address 0 of the correction data memory 24, which therefore outputs data 0. Accordingly, in the initial state, the adder 25 outputs a channel selection data from the CPU 13 without changing, and therefore the local oscillation frequency is not adjusted. At this point, it is determined that a pseudo carrier locked state exists and the operation of the timer 22 commences. After a predetermined amount of time has elapsed, the address counter 23 counts up to 1 to thereby output an address signal for designating the address 1 in the correction data memory 24. The correction data memory 24 then outputs correction data+fsym/$2^n$, which causes the adder 25 to output data corresponding to (channel selection data+fsym/$2^n$).

Accordingly, the local oscillation frequency is corrected to change the phases of I and Q signal vectors, which causes the carrier reproduction loop of the demodulator 6 to temporarily enter an unlocked state. As a result, when the lock detection signal b of the phase error detection circuit 10 enters an inactive state, the pseudo lock detection signal c is disabled to temporarily interrupt the operation of the timer 22. Subsequently, when the carrier reproduction loop is locked to put the lock detection signal b into an active state, the pseudo lock detection signal c enters an enable state to thereby temporarily release the interruption of the timer 22.

Thereafter, when the carrier reproduction loop is normally locked such that correct data can be obtained from the demodulator 6, a frame synchronization pattern is detected to make the frame detection signal a active and the pseudo lock detection signal c disable. This causes the operation of the timer 22 to be temporarily interrupted to hold the counting operation of the address counter 23. Accordingly, the correction data is not updated to hold the output of correction data+fsym/$2^n$, and a normal locked state of the carrier reproduction loop is maintained.

On the other hand, when the carrier reproduction loop is in a pseudo carrier locked state, a baseband signal does not contain correct data and therefore a frame detection signal remains inactive to output a pseudo lock detection signal c. Accordingly, the timer 22 continues counting and the address counter 23 is updated to "2" after elapse of a predetermined amount of time, such that the address data memory 24 outputs correction data−fsym/$2^n$ from the address 2 thereof to thereby correct the local oscillation frequency fr. This correction process for the local oscillation frequency fr is repeated until the carrier reproduction loop is normally locked in the order described in FIG. 2, for example, in which correction data is multiplied by +1, −1, +2, −2 . . . and so on.

According to the present invention, a pseudo carrier locked state can be detected without employing software processing in the CPU, to thereby reduce the burden on the CPU. It is possible to quickly release the pseudo carrier locked state because the local oscillation frequency is sequentially corrected using correction beginning from that data corresponding to a phase shift having a higher possibility of pseudo carrier lock occurrence.

While the preferred embodiment of the present invention has been described using specific terms, such description is for illustrative purposes only, and it is to be understood that changes and variations may be made without departing from the spirit or scope of the appended claims.

What is claimed is:

1. A quadrature demodulation circuit for demodulating a quadrature phase demodulation signal into a baseband signal using a reproduction carrier reproduced from a carrier reproduction loop, comprising:
   a carrier lock detection circuit for detecting a locked state of the carrier reproduction loop;
   a frame synchronization detection circuit for detecting frame synchronization in said baseband signal, and
   a pseudo lock detection circuit for determining a pseudo locked state by detecting that the carrier reproduction loop is locked and that frame synchronization is not established.

2. A quadrature demodulation circuit according to claim 1, further comprising:
   a local oscillation circuit for outputting a local oscillation signal synchronized with said reproduction carrier; and
   a pseudo lock prevention circuit for altering the frequency of said local oscillation signal when a pseudo locked state is detected.

3. A quadrature demodulation circuit according to claim 2, wherein said pseudo lock prevention circuit includes:
   a timer being actuated when the pseudo locked state is determined by said pseudo lock detection circuit;
   an address counter for counting up in accordance with an output signal of said timer to output an address signal according to a count value; and
   a correction data memory from which correction data is read out of an address corresponding to said address signal,
   wherein the local oscillation frequency of said local oscillation circuit is changed based on the correction data read from said correction data memory.

4. A quadrature demodulation circuit according to claim 3, further comprising an adder for adding channel selection data for setting the local oscillation frequency and the correction data, the local oscillation frequency of said local oscillation circuit being determined based on an output from the adder.

5. A quadrature demodulation circuit according to claim 4, wherein said correction data memory includes one 0 data, which is read out when said address counter does not count up, such that said adder outputs said channel selection data without any change.

6. A quadrature demodulation circuit according to claim 4, said correction data memory stores a plurality of correction data based on phase differences which cause said pseudo locked state to occur, said correction data being read out in order beginning from that with a smaller phase difference.

7. A quadrature demodulation circuit according to claim 1, wherein said frame synchronization detection circuit detects frame synchronization by detecting a synchronization pattern contained in each frame of the baseband signal.

8. A quadrature demodulation circuit according to claim 7, wherein said frame synchronization detection circuit determines that frame synchronization is established when the synchronization pattern is detected in succession for a plurality of frames, and outputs a frame synchronization signal.

9. A quadrature demodulation circuit according to claim 8, wherein data reception from said baseband signal commences when said frame synchronization signal is output.

10. A quadrature demodulation circuit according to claim 9, further comprising:
   a local oscillation circuit for outputting a local oscillation signal; and
   a pseudo lock prevention circuit for altering the frequency of said local oscillation signal when a pseudo locked state is detected.

11. A quadrature demodulation circuit according to claim 9, wherein said pseudo lock prevention circuit includes:
   a timer being actuated when the pseudo locked state is determined by said pseudo lock detection circuit;
   an address counter for counting up in accordance with an output signal of said timer to output an address signal according to a count value; and
   a correction data memory from which correction data is read out of an address corresponding to said address signal,
   wherein the local oscillation frequency of said local oscillation circuit is changed based on the correction data read from said correction data memory.

12. A quadrature demodulation circuit according to claim 11, further comprising an adder for adding channel selection data for setting the local oscillation frequency and the correction data, the local oscillation frequency of said local oscillation circuit being determined based on an output from the adder.

13. A quadrature demodulation circuit according to claim 12, wherein said correction data memory includes one 0 data, which is read out when said address counter does not count up, such that said adder outputs said channel selection data without any change.

14. A quadrature demodulation circuit according to claim 12, said correction data memory stores a plurality of correction data based on phase differences which cause said pseudo locked state to occur, said correction data being sequentially read out beginning from that with a smaller phase difference.

15. A quadrature demodulation circuit for demodulating a quadrature phase demodulation signal into a baseband signal using a reproduction carrier reproduced from a carrier reproduction loop, comprising:
   a pseudo lock detection circuit for detecting a pseudo locked state of the carrier reproduction loop;
   a timer being actuated when the pseudo locked state is determined by said pseudo lock detection circuit;
   an address counter for counting up in accordance with an output signal of said timer to output an address signal according to a count value; and
   a correction data memory from which correction data is read out of an address corresponding to said address signal,
   wherein the local oscillation frequency of said local oscillation circuit is changed based on the correction data read from said correction data memory.

16. A quadrature demodulation circuit according to claim 15, further comprising:
   a local oscillation circuit for outputting a local oscillation signal synchronized with said reproduction carrier; and
   a pseudo lock prevention circuit for altering the frequency of said local oscillation signal when a pseudo locked state is detected.

17. A quadrature demodulation circuit according to claim 16, further comprising an adder for adding channel selection data for setting the local oscillation frequency and the correction data, the local oscillation frequency of said local oscillation circuit being determined based on an output from the adder.

18. A quadrature demodulation circuit according to claim 17, wherein said correction data memory includes one 0 data value, which is read out when said address counter does not count up, such that said adder outputs said channel selection data without any change.

19. A quadrature demodulation circuit according to claim 17, wherein said correction data memory stores a plurality of correction data based on phase differences which cause said pseudo locked state to occur, said correction data being read out in order beginning from that with a smaller phase difference.

* * * * *